(12) United States Patent
Lee et al.

(10) Patent No.: US 10,459,628 B2
(45) Date of Patent: *Oct. 29, 2019

(54) TERMINAL AND METHOD FOR CONTROLLING DISPLAY OF MULTI WINDOW

(71) Applicant: Pantech Inc., Seoul (KR)

(72) Inventors: Jin Taek Lee, Seoul (KR); Sang-Ryun Yu, Seoul (KR); Chul-Gee Lee, Seoul (KR)

(73) Assignee: Pantech Co., Ltd., Seoul (KR)

( * ) Notice: Subject to any disclaimer, the term of this patent is extended or adjusted under 35 U.S.C. 154(b) by 442 days.

This patent is subject to a terminal disclaimer.

(21) Appl. No.: 15/424,576

(22) Filed: Feb. 3, 2017

(65) Prior Publication Data

US 2017/0147205 A1 May 25, 2017

Related U.S. Application Data

(63) Continuation of application No. 14/486,498, filed on Sep. 15, 2014, now Pat. No. 9,563,356.

(30) Foreign Application Priority Data

Sep. 23, 2013 (KR) .......................... 10-2013-0112337

(51) Int. Cl.
*G06F 3/0488* (2013.01)
*G06F 9/451* (2018.01)
*G06F 3/0484* (2013.01)

(52) U.S. Cl.
CPC ...... *G06F 3/04886* (2013.01); *G06F 3/04847* (2013.01); *G06F 9/452* (2018.02); *G06F 2203/04803* (2013.01)

(58) Field of Classification Search
CPC .................................................. G06F 3/04886
USPC ............................................................ 715/789
See application file for complete search history.

(56) References Cited

U.S. PATENT DOCUMENTS

| 4,783,648 A | * | 11/1988 | Homma | ................ G06F 3/0481 715/794 |
| 5,305,435 A | * | 4/1994 | Bronson | ............... G06F 3/0481 715/775 |
| 6,342,908 B1 | * | 1/2002 | Bates | .................... G06F 3/0481 715/789 |

(Continued)

OTHER PUBLICATIONS

Notice of Allowance dated Sep. 23, 2016, in U.S. Appl. No. 14/486,498.

*Primary Examiner* — Reza Nabi
(74) *Attorney, Agent, or Firm* — H.C. Park & Associates, PLC

(57) ABSTRACT

A terminal for controlling a display of a multi window includes: an event detecting unit for detecting an execution, change, or finish event of an application; a display analyzing unit for analyzing screens of applications executed on a multi window which includes a mini window; a display controller for controlling a location and size of the mini window based on an analysis result of the display analyzing unit; and a display unit for displaying the mini window at a controlled location. Accordingly, a window to which an always-on-top (AOT) operation is set is automatically disposed not to disturb the use of an application executed in a non-mini window, thereby giving convenience to a user.

16 Claims, 5 Drawing Sheets

(56) References Cited

U.S. PATENT DOCUMENTS

| | | | |
|---|---|---|---|
| 2003/0142139 A1* | 7/2003 | Brown | G06F 3/0481 715/800 |
| 2007/0180401 A1* | 8/2007 | Singh | G06F 3/0481 715/794 |
| 2010/0058230 A1* | 3/2010 | Shing | G06F 9/451 715/788 |
| 2012/0084717 A1* | 4/2012 | Yao | G06F 3/0481 715/792 |
| 2013/0227472 A1* | 8/2013 | Sosinski | G06F 3/0481 715/794 |
| 2015/0067591 A1* | 3/2015 | Nancke-Krogh | G06F 3/0481 715/804 |
| 2015/0089443 A1* | 3/2015 | Lee | G06F 9/452 715/789 |

* cited by examiner

TERMINAL AND METHOD FOR CONTROLLING DISPLAY OF MULTI WINDOW

CROSS-REFERENCE TO RELATED APPLICATION

This application is a continuation of U.S. patent application Ser. No. 14/486,498, filed on Sep. 15, 2014, which claims priority to Korean Patent Application No. 10-2013-0112337, filed on Sep. 23, 2013, and all the benefits accruing therefrom under 35 U.S.C. § 119, the contents of which in its entirety are herein incorporated by reference.

BACKGROUND

Field

The present disclosure relates to a terminal and method for controlling a display of a multi window, and more particularly, to a terminal and method for controlling a display of a multi window, in which a display of a multi window executing an always-on-top (AOT) operation is automatically disposed.

Discussion of the Background

A multi window used in a mobile device is a operation of a user interface which not only displays various task states but also allows a user to actually click an item and execute several tasks while shifting from one task to another task. A user may execute different tasks at several windows, move any window, change a size of a window, or makes a window overlap with non-mini window.

In particular, an always-on-top (AOT) operation gives a view which is always placed on the top regardless of windows for other programs or applications. The AOT operation is useful when a multi window operation is employed since a program window desired by a user is always kept on the top.

However, if the AOT operation is used, a window of a program to which the AOT operation is set is always provided at a designated location regardless of programs which are being executed or to be newly executed. Therefore, a program which is being executed or to be executed may not be currently used by the user, and in this case, the user should rearrange the screen of the program to which the AOT operation is set to an available location.

For example, if a user executes a window for writing a message while executing a program to which the AOT operation is set, the window of the program to which the AOT operation is set may be displayed to overlap with an input method editor (IME) for inputting text. In this case, the user should move the window of the program to which the AOT operation is set in order to write a message.

As another example, when a user executes a web browser for web surfing while executing a program to which the AOT operation is set, the window of the program to which the AOT operation is set may be displayed on an input field in which a touch input should be input, which may cause inconvenience.

As described above, an AOT operation generates a window without considering the location of another program or application and a location requiring user input. Therefore, in order to use a multi window operation, a user needs to manually change the location or size of a window of a program to which the AOT operation is set.

SUMMARY

The present disclosure is directed to providing a terminal for controlling display of a multi window, which automatically controls a location or size of a mini window to which an AOT operation is set.

The present disclosure is also directed to providing a method for controlling a display of a multi window in the above terminal.

According to the terminal and method for controlling display of a multi window, a location of a mini window to which an AOT operation is set may be automatically controlled based on the relation of the mini window to a non-mini window. Therefore, a user may use an application executed in a non-mini window without disturbing the mini window, and thus the user need not move the mini window.

In a further aspect, the disclosure provides a terminal for controlling display of a mini window on a multi window. A display is configured to display a mini window and configured to display a multi window. An event detector is configured to determine a change of the display caused by an event, the event being one of execution, change, or finish of a first application in the mini window or a second application in the multi window. A display analyzer is configured to analyze images of the first application or the second application, or both the first application and the second application and determine the presence of a touch event region in the second application images, the display analyzer being further configured to analyze coordinate and size attributes of the mini window. A display controller is configured to control a location and size of the mini window based on a display analyzer analysis for positioning the mini window at a first position on the display in a first display region separate from a second position on the display having the touch event region.

In another aspect, the present disclosure provides a method for controlling display of a mini window on a terminal in which a change is detected in a display caused by an execution, change or finish event of a first application in a mini window or a second application in a multi window of a terminal display. It is determined whether an always on top operation is set for the mini window. Images of the second application are analyzed to determine the presence of a touch event region in the multi window. The size and location of the mini window are determined. The mini window is automatically positioned in a region of the display that is different from the touch event region.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION

Figure 1:
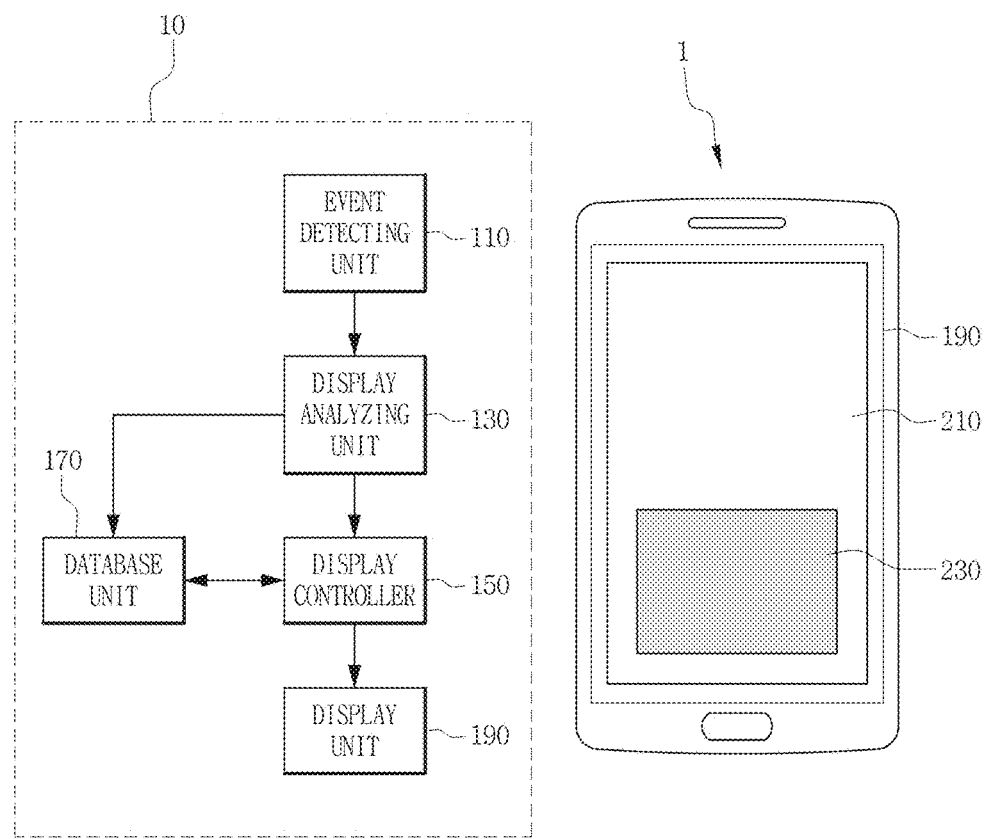
FIG. 1 is a block diagram showing a terminal for controlling display of a multi window according to an embodiment of the present disclosure.

One or more exemplary embodiments will be described in detail with reference to the accompanying drawings. Exemplary embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some exemplary embodiments. Unless otherwise noted, like reference characters denote like elements throughout the attached drawings and written description, and thus descriptions will not be repeated.

In the drawings, the size and relative sizes of regions and components may be exaggerated for clarity. Like numerals denote like elements.

When an element is referred to as being "on," "connected to," or "positioned on" another element or layer, it may be directly on, connected to, or positioned on the other element or intervening elements may be present. When, however, an element is referred to as being "directly on," "directly connected to," or "directly positioned on" another element, there are no intervening elements present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, and/or sections, these elements, components, regions, and/or sections should not be limited by these terms. These terms are used to distinguish one element, component, region, and/or section from another element, component, region, and/or section. Thus, a first element, component, region, and/or section discussed below could be termed a second element, component, region, and/or section without departing from the teachings of the present disclosure.

Spatially relative terms, such as "beneath," "below," "lower," "above," "upper," "left," "right," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing exemplary embodiments only and is not intended to be limiting. As used herein, the singular forms "a", "an", and "the" are intended to include the plural forms as well, unless the context clearly indicates otherwise. Moreover the terms "comprises," "comprising," "have," "having," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, a terminal and method for controlling display of a multi window according to an embodiment of the present disclosure will be described in detail with reference to the accompanying drawings.

Figure 2:
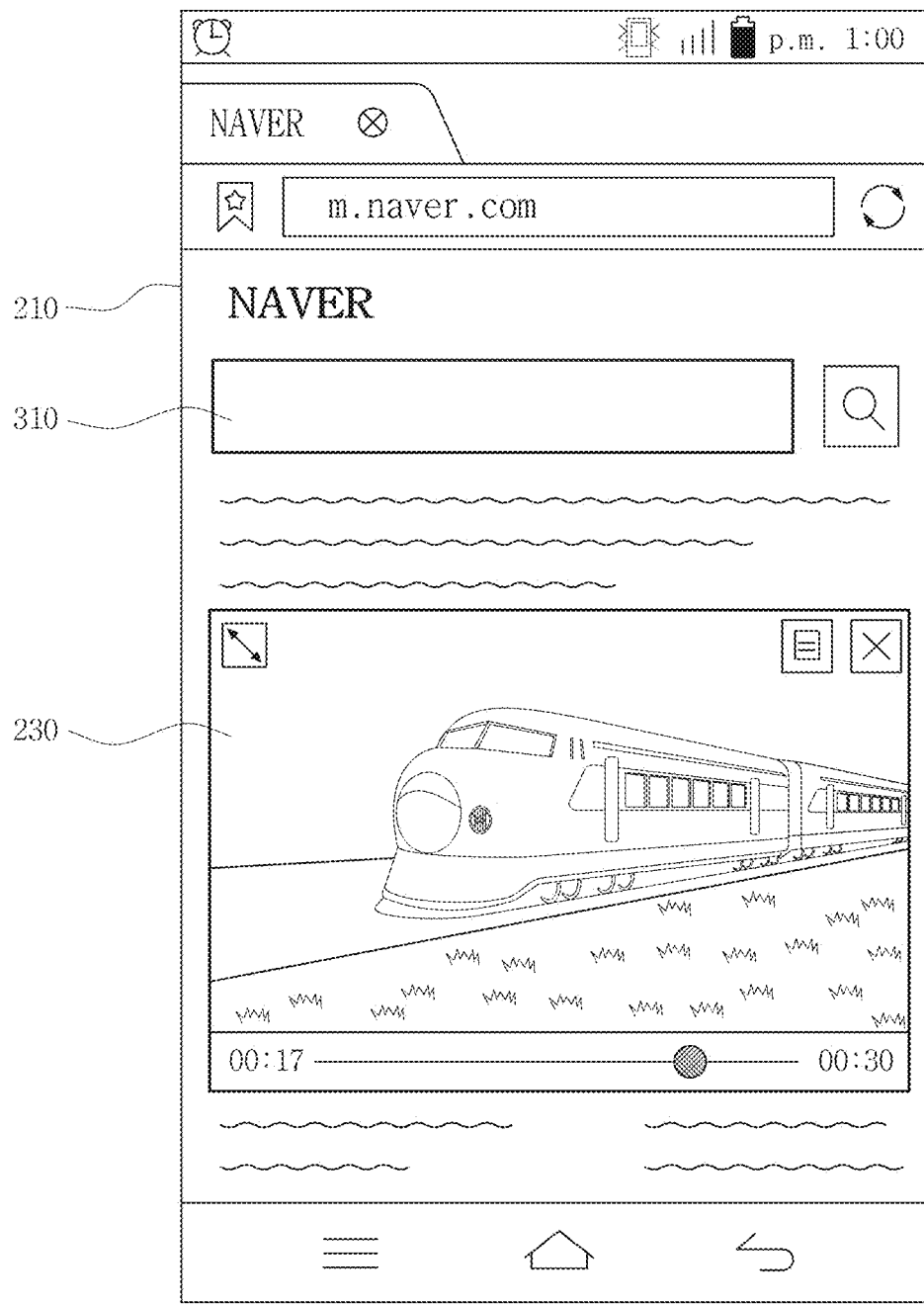
FIG. 2 shows a screen where display of a multi window is controlled according to the present disclosure.
Figure 3A:
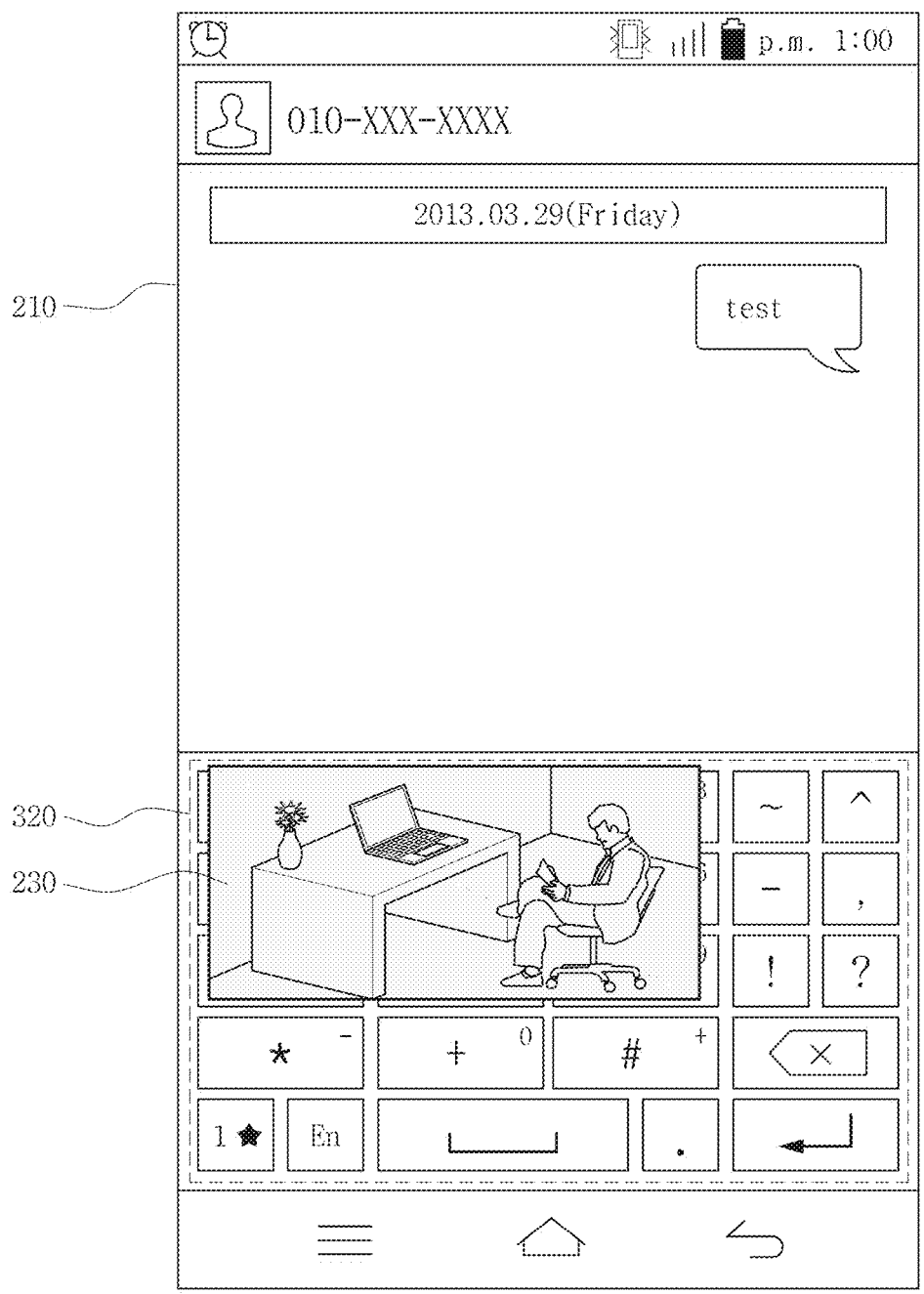
FIG. 3A shows a screen according to related art for display of a multi window.
Figure 3B:
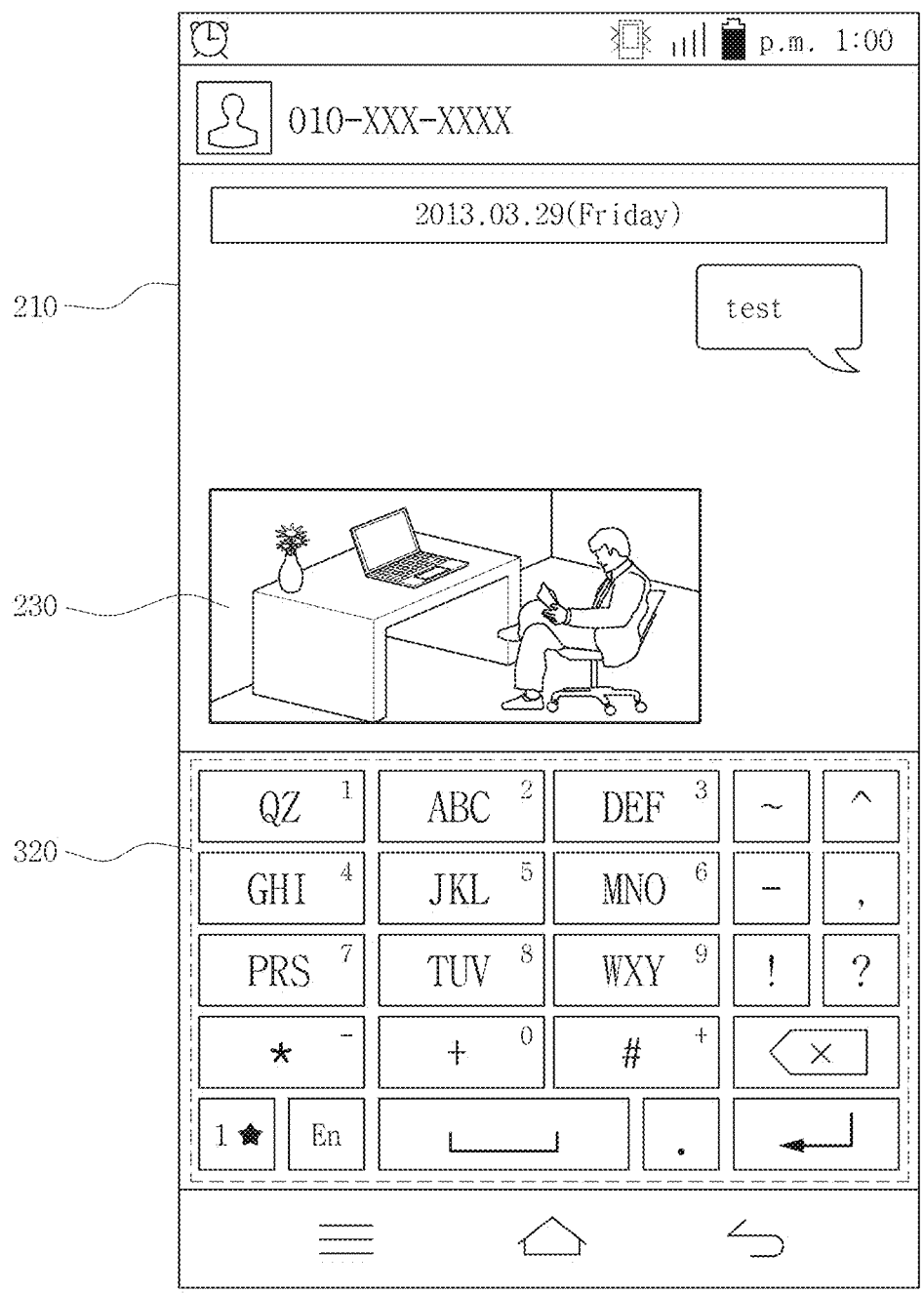
FIG. 3B shows a screen where display of a multi window is controlled according to the present disclosure.

FIG. 1 is a block diagram showing a terminal for controlling display of a multi window according to an embodiment of the present disclosure. FIGS. 2 and 3B show screens in which display of a multi window is controlled according to the present disclosure.

Referring to FIG. 1, a terminal 1 according to the present disclosure includes a module 10 for controlling display of a multi window, and the module 10 includes an event detecting unit/event detector 110, a display analyzing unit/display analyzer 130, a display controller 150 and a display unit/display 190. The module 10 may further include a database unit/database 170 for storing analyzed data and user-set data.

The terminal 1 may be fixed or movable, and may also be alternatively described as, for example, user equipment (UE), a mobile station (MS), a mobile terminal (MT), a user terminal (UT), a subscriber station (SS), a wireless device, a personal digital assistant (PDA), a wireless modem, a handheld device or similar terms as are known by those of ordinary skill in the terminal art.

As a device supporting wireless communication, the terminal 1 may employ various kinds of mobile devices such as a smart phone, a cellular phone, a tablet computer, a notebook, a net book, a personal digital assistant (PDA), a portable multimedia player (PMP), a play station portable (PSP), an MP3 player, an e-book reader, a navigator, a smart camera, an electronic dictionary, an electronic clock, a game player or the like as well as electronic devices having any kind of communication operation such as a desktop device, a smart TV, a printer, a facsimile or the like.

The terminal 1 may execute various kinds of applications based on an operating system (OS). The OS is a system program for allowing an application to use hardware of the terminal, and may employ mobile computer operating systems such as Android OS, iOS, Windows Mobile OS, Bada OS, Symbian OS, Blackberry OS or the like as well as computer operating systems such as Window-series operating systems, Linux-series operating systems, Unix-series operating systems, MAC, AIX, HP-UX or the like.

The application is a program developed to perform a specific task by using a terminal and may employ various multimedia contents such as games, moving pictures and photos, or any kind of program such as an image viewer or a moving picture regenerator using such multimedia contents as well as various application programs and service objects. Hereinafter, the term "application" should be interpreted to include all kinds of application programs and executable programs.

The terminal 1 may display an application through the display unit 190 or provide a user interface (UI) to a user through the display unit 190. The display unit 190 may employ a liquid crystal display (LCD) panel, a plasma display panel (PDP), an organic light-emitting diode (OLED) display panel or any other displays that can produce a viewable image to a user.

In addition, in order to process an input of the user, a touch-screen operation may be included in the display unit/display 190 or provided using a separate touch pad device. In other cases, the terminal 1 may also include an input method editor (not shown) such as a keypad which is formed separately from the display unit 190 to receive an input of the user.

At least two windows 210, 230 may be displayed on the display 190, and at least one of them may be a mini window 230. As used herein, the expression "mini window" relates to a window which is displayed with a window size smaller than the size of the display unit 190. In addition, an always-on-top (AOT) operation may be set to the mini window 230 to give a view which is always placed on the top (that is, it is visible to the user) regardless of windows of other applications.

Hereinafter, in the multi window, a window other than the mini window 230 will be called a non-mini window 210. Generally, the non-mini window 210 is displayed on the entire region of the display unit 190 although in some circumstances the non-mini window is displayed on less than the entire region of display 190.

The event detecting unit/event detector 110 detects a change of screen on the multi window executed at the terminal 1 by an event. The event may be detected through a package manager of a framework of the terminal 1.

The event detecting unit 110 detects an event such as execution, change and/or finish of an application on the terminal 1, and also detects a change of screen along with the execution of an application. In addition, the event detecting unit 110 detects execution, change and/or finish events of a program which performs the AOT operation.

The display analyzing unit/analyzer 130 analyzes images of applications executed in the mini window 230 and the non-mini window 210. In particular, the display analyzing unit 130 may analyze a touch event region and an image display region of the non-mini window 210.

For example, the display analyzing unit 130 may analyze coordinate, size and attribute information of the mini window 230 by detecting information from the AOT application. The display analyzer 130 may extract attribute information of an application executed in the non-mini window 210, for example information about a package name and right, through the package manager to collect and analyze the information. Similarly, the display analyzing unit 130 may also collect and analyze information about a coordinate and size of the non-mini window 210.

In addition, the display analyzing unit 130 may analyze a coordinate and size of the touch event region and the image display region of the non-mini window 210 through a view server of the framework. The display analyzing unit 130 may store the analyzed data in the database 170.

The database unit 170 may store at least one of coordinate, size and attribute information of the mini window 230, attribute information of an application executed in the non-mini window 210, a coordinate and size of the non-mini window 210, and a coordinate and size of the touch event region and the image display region of the non-mini window 210. In addition, the database unit 170 may store data directly set by the user.

The display controller 150 controls a location and size of the mini window 230 based on results of an analysis performed by the display analyzing unit 130. The display controller 150 may calculate and determine the location and size of the mini window 230 based on the data stored in the database unit 170.

The data stored in the database 170 may be data analyzed by the display analyzing unit 130 or data directly set by the user. The display controller 150 may selectively or successively apply the data analyzed by the display analyzing unit 130 and the data directly set by the user.

Referring to FIG. 2, when there is a touch event region 310 in the non-mini window 210, the display controller 150 (FIG. 1) may position the mini window 230 in a region other than the touch event region 310. In this case, since the touch event region 310 requiring a user input is not hidden by the mini window 230 due to the operation of the display controller, the user need not rearrange the mini window 230 to be able to input information to touch event region 310. Therefore, due to automatic positioning of mini window 230 in a region that does not obscure the touch event region 310, it is not necessary for a user to re-position the mini window, making the display 190 of terminal 1 convenient to use. Referring to FIG. 3A, a terminal that does not automatically re-position the mini window is depicted. The description of FIG. 3A is related art, that is, it is not according to the present disclosure but is presented here for a better understanding of the present disclosure. When the terminal 1 executes a text writing operation to input text or the like while the AOT operation is being executed, the mini window 230 to which the AOT operation is set overlaps and interferes with an input method editor (IME) 320 displayed on the display unit 190. In this case, the user may not readily use the input method editor 320. Instead, in order to input text or the like through the input method editor 320, the user needs to reposition the mini window 230 to a region that does not overlap the input method editor 320.

In contrast, according to the present disclosure, the display controller 150 dynamically changes a location of the mini window 230. That is, the mini window is automatically repositioned to a region where it does not interfere with an input method editor or other input mechanism. Since the display controller rearranges the mini window 230, the user need not re-position the mini window 230.

Referring to FIG. 3B, the display controller 150 controls the position of the mini window 230 so that it does not hide the input method editor 320 which is displayed on the display unit 190 for inputting text. In this case, when using the input method editor 320 for making a telephone call, sending a message, or searching, the user is not disturbed by the mini window 230 as it has been automatically repositioned away from the input region.

Further, the display controller 150 may re-position the mini window 230 considering not only the touch event region 310 (as seen in FIG. 2) but also a region where the input method editor 320 is displayed when a touch is input to the region of the touch event region 310. For example, as seen in FIG. 3B, the mini window 230 does not obscure region 320 where data entry keys are positioned.

If the non-mini window 210 has an image display region, the display controller 150 may position the mini window 230 in the image display region. In this case, since the image display region of the non-mini window 210 has no touch event region for a user input, the mini window 230 disposed in the image display region does not interfere with execution of another application.

If there is a plurality of mini windows 230, the display controller 150 may determine locations and sizes of the mini windows 230 according to priorities of applications executed in each of the respective mini windows 230. The priorities of the applications may be included in the attribute information of an application, and may also be set in advance by the user based on relative importance to the user. For example, a dialer for making a call may be set to have a high priority and disposed at the uppermost place in the multi window.

The display controller 150 may determine a location and size of the mini window 230 and store the data in relation to the coordinate and size of the mini window 230 in the database unit 170.

In addition, if there is a region set by the user, the display controller 150 may dispose the mini window 230 in the region set by the user. In this case, the display controller 150 may not execute a process for calculating a location and size of the mini window 230.

The display unit 190 receives information about the location and size determined by the display controller 150 through a system layer and displays the mini window 230 with the determined size at the determined location.

As described above, if the terminal 1 for controlling a display of a multi window according to the present disclosure is used, the mini window 230 is positioned so it does not overlap the touch event region or the like of the non-mini window 210, and thus the user may conveniently make an input to the touch event region and conveniently use the input method editor.

Figure 4:
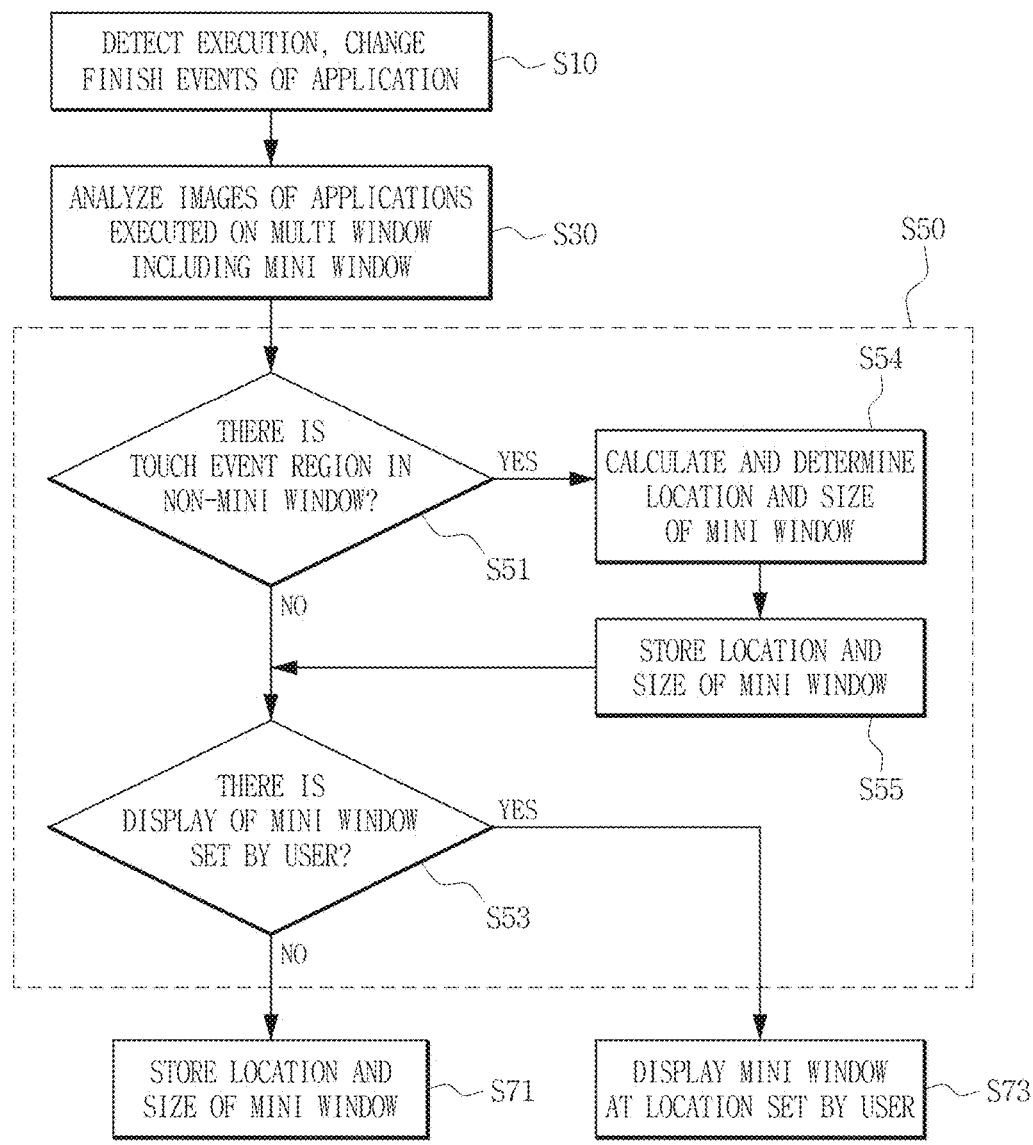
FIG. 4 is a flowchart for illustrating a method for controlling display of a multi window according to another embodiment of the present disclosure.

FIG. 4 is a flowchart for illustrating a method for controlling display of a multi window according to another embodiment of the present disclosure.

The method for controlling display of a multi window according to the present disclosure may be performed using a configuration substantially identical to the terminal 1 of FIG. 1. Therefore, a like reference is used to indicate a like element of the terminal 1 of FIG. 1 and will not be described in detail.

Referring to FIG. 4, an execution, change or finish event of an application is detected to check a change of screen on a multi window executed at the terminal 1 (Step S10). In particular, it may be detected where there is a mini window to which an AOT operation is set.

If the AOT operation is executed for the mini window, images of applications executed on the mini window and the non-mini window (which means a window among the multi window other than the mini window) are analyzed (Step S30). For example, a touch event region and an image display region of the non-mini window, coordinate, size and attribute information of the mini window or the like may be analyzed. The analyzed information may be stored as data in the database unit.

The location and size of the mini window are controlled based on the analyzed data (Step S50).

To determine the location and size of the mini window, it is determined whether there is a touch event region in the non-mini window (Step S51). If there is no touch event region in the non-mini window, the application of the non-mini window may be executed without any disturbance of the mini window, and thus the mini window may be displayed at any location with any size (Step S71).

However, if the user sets a display of the mini window in advance (Step S53), the mini window may be displayed with the location and size set by the user (Step S73).

If there is a touch event region in the non-mini window, the location and size of the mini window are calculated and determined based on the analyzed data (Step S54).

For example, the mini window may be positioned in a region except for the touch event region. Therefore, when making a call, sending a message or searching in the non-mini window, the user is not disturbed by the mini window and thus need not re-position the mini window.

If there is an image display region in the non-mini window, the mini window may be disposed in the image display region. If there is a plurality of mini windows to which an AOT operation is set, locations and sizes of the mini windows may be determined according to priorities of applications executed in the respective mini windows.

The determined location and size of the mini window may be stored in the database unit (Step S55). However, if the user sets a display of the mini window in advance (Step S53), the mini window may be displayed according to a location and size set by the user (Step S73).

In this embodiment, after determining a location and size of the mini window, it is determined whether the user sets a display of a mini window in advance. However, if there is a set value, different from the above, it is also possible to display the mini window according to the user setting without determining a location and size of the mini window.

The terminal 1 displays the mini window according to the determined location and size (Step S71).

As described above, if the method for controlling display of a multi window according to the present disclosure is used, the mini window is positioned to not overlap a touch event region or the like of a non-mini window, and thus the user may conveniently make an input in the touch event region or conveniently use the input method editor.

While the exemplary embodiments have been shown and described, it will be understood by those skilled in the art that various changes in form and details may be made thereto without departing from the spirit and scope of the present disclosure as defined by the appended claims.

What is claimed is:

1. A terminal for controlling a display of a multi window, the terminal comprising: an event detector for detecting an execution, change, or finish event of an application;
    a display analyzer for analyzing one or more screens corresponding to one or more applications executed on the multi window comprising a mini window, the mini window being configured to be always on top;
    a display controller for controlling a location and a size of the mini window based on an analysis result of the display analyzer; and
    a display for displaying the mini window at the controlled location, wherein the display analyzer analyzes a touch event region and an image display region of a non-mini window other than the mini window, wherein the display controller disposes the mini window in the image display region of the non-mini window.

2. The terminal for controlling a display of a multi window according to claim 1, wherein the display controller calculates the location and the size of the mini window.

3. The terminal for controlling a display of a multi window according to claim 1, wherein the display controller disposes the mini window in a region other than the touch event region of the non-mini window.

4. The terminal for controlling a display of a multi window according to claim 1, wherein the display controller disposes the mini window in a region set by a user.

5. The terminal for controlling a display of a multi window according to claim 1, wherein when there is a plurality of mini windows, the display controller determines locations and sizes of the mini windows according to priorities of applications executed in the mini windows.

6. The terminal for controlling a display of a multi window according to claim 1, further comprising a database for storing data analyzed by the display analyzer.

7. The terminal for controlling a display of a multi window according to claim 6, wherein the database stores at least one of a coordinate, the size, and an attribute information of the mini window, an attribute information of an application executed in a nonmini window, a coordinate and a size of the non-mini window, coordinates and sizes of a touch event region and an image display region of the non-mini window, and user setting data.

8. The terminal for controlling a display of a multi window according to claim 6, wherein the display controller determines the location and the size of the mini window based on the data stored in the database, and stores the determined location and size of the mini window in the database.

9. A method for controlling a display of a multi window, comprising: detecting an execution, change, or finish event of an application;
analyzing data of one or more screens corresponding to one or more applications executed on the multi window comprising a mini window, the mini window being configurable to be always on top operation;
controlling a location and a size of the mini window based on the analyzed data; and displaying the mini window at the controlled location, wherein display analyzer analyzes a touch event region and an image display region of a non-mini window other than the mini window, wherein the display controller disposes the mini window in the image display region of the non-mini window.

10. The method for controlling a display of a multi window according to claim 9, wherein the mini window is configured to be always on top.

11. The method for controlling a display of a multi window according to claim 9, further comprising calculating the location and the size of the mini window.

12. The method for controlling a display of a multi window according to claim 9, further comprising disposing the mini window in a region other than the touch event region of the non-mini window.

13. The method for controlling a display of a multi window according to claim 9, further comprising disposing the mini window in a region set by a user.

14. The method for controlling a display of a multi window according to claim 9, wherein when there is a plurality of mini windows, locations and sizes of the mini windows are determined according to priorities of applications executed in the mini windows.

15. The method for controlling a display of a multi window according to claim 9, further comprising storing the analyzed data.

16. The method for controlling a display of a multi window according to claim 9, further comprising storing the controlled location and size of the mini window.

* * * * *